No. 669,240. Patented Mar. 5, 1901.
H. F. HOBEL.
ELECTRODE PLATE FOR ELECTRIC ACCUMULATORS.
(Application filed Oct. 20, 1900.)
(No Model.)

WITNESSES:
Ella L. Gyler
Clara D. Froblach

INVENTOR
Heinrich Franz Hobel
BY
Richards & Co.
ATTORNEYS

UNITED STATES PATENT OFFICE.

HEINRICH FRANZ HOBEL, OF BERLIN, GERMANY, ASSIGNOR TO AKKUMULATOREN & ELEKTRICITÄTSWERKE AKTIENGESELLSCHAFT VORM. W. A. BOESE & CO., OF BERLIN S. O., GERMANY.

ELECTRODE-PLATE FOR ELECTRIC ACCUMULATORS.

SPECIFICATION forming part of Letters Patent No. 669,240, dated March 5, 1901.

Application filed October 20, 1900. Serial No. 33,706. (No model.)

*To all whom it may concern:*

Be it known that I, HEINRICH FRANZ HOBEL, a subject of the Emperor of Austria-Hungary, residing at the city of Berlin, in the Kingdom of Prussia, German Empire, have made a new and useful Invention in Electrode-Plates for Electric Accumulators, of which the following is a specification.

The invention relates to electrode-plates for electric accumulators of such kind as have been described in my former patent specification, No. 629,363, dated July 23, 1899.

The plate comprises a frame comprising a series of bars from which two series of leaves project, one series extending from the central portions of said bars to the front and the other series to the rear. In the present invention the two series of leaves are not only arranged in staggered relation or alternately in relation to each other, but each series are in staggered relation to the leaves carried by the adjacent bars.

The new electrode-plate is shown in the accompanying drawings.

Figure 1:
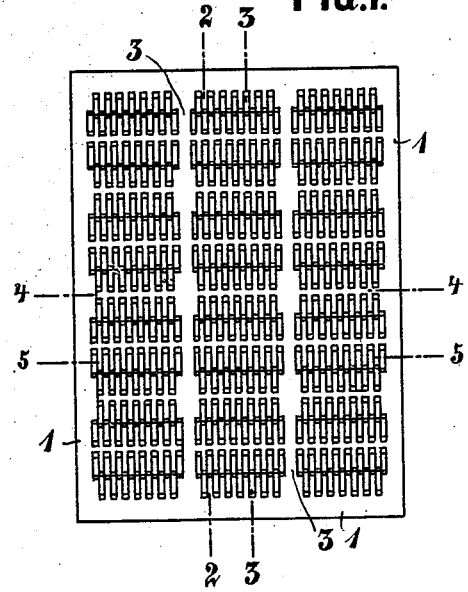
Figure 2:
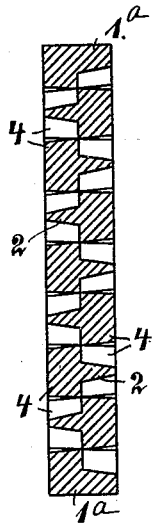
Figure 3:
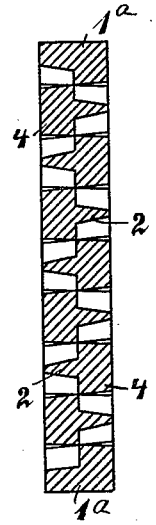
Figure 4:
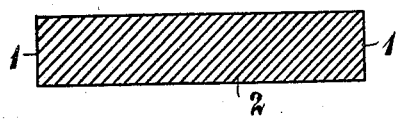
Figure 5:
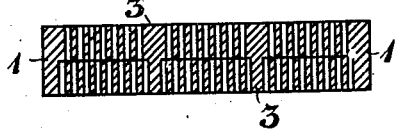
Figure 6:
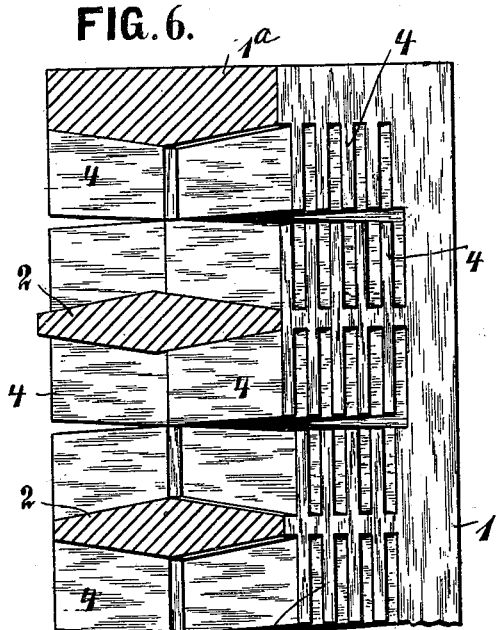

Figure 1 is an elevation of the improved grid or latticed plate; Fig. 2, a section on the line 2 2 of Fig. 1; Fig. 3, a section on the line 3 3 of Fig. 1; Fig. 4, a section on the line 4 4 of Fig. 1; Fig. 5, a section on the line 5 5 of Fig. 1; Fig. 6, a perspective view of a part broken from the new plate.

The plate comprises a frame consisting of sides 1, end cross-bars 1ª, intermediate cross-bars 2, and strengthening-ribs 3, extending between bars 1ª and intersecting with bars 2. The inner faces of bars 1ª and both sides of bars 2 are beveled from their central portions toward their edges, and from these faces leaves 4 project. These leaves, as clearly shown in Fig. 6, widen toward their outer edges. Each bar 1ª and 2 carries two series of leaves, one series extending from the beveled faces on one side of the central point of the bars and the other series from the other beveled faces. The two series carried by each bar are arranged in staggered relation to each other and also in staggered relation with the leaves projecting from the corresponding side of the centers of the adjacent bars.

The new plate may be cast.

Having now described my invention, what I claim as new, and desire to secure by Letters Patent, is—

An electrode-plate comprising a plurality of bars each of said bars having two series of leaves projecting from the same, the leaves of one set of each bar being arranged in staggered relation with the opposite set and the leaves carried by each bar being arranged in staggered relation with the leaves of the bar adjacent thereto.

In witness whereof I have hereunto set my hand in presence of two witnesses.

HEINRICH FRANZ HOBEL.

Witnesses:
 HENRY HASPER,
 WOLDEMAR HAUPT.